Jan. 17, 1933.   H. W. GOODALL   1,894,269
HOSE
Filed April 8, 1931
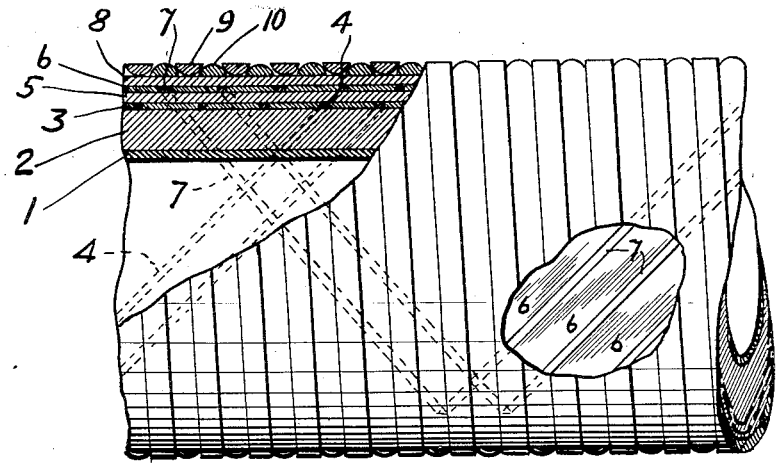
FIG.1.
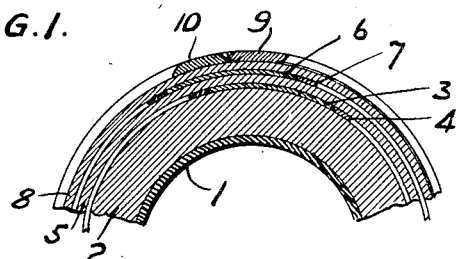
FIG.2.
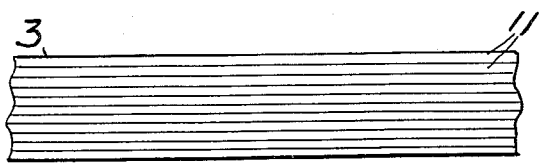
FIG.3.
 
FIG.4.   FIG.5.   FIG.6.
INVENTOR
Howard W. Goodall
BY
Augustus B. Stoughton
ATTORNEY.
WITNESS:

Patented Jan. 17, 1933

1,894,269

UNITED STATES PATENT OFFICE

HOWARD W. GOODALL, OF ALDAN, PENNSYLVANIA

HOSE

Application filed April 8, 1931. Serial No. 528,505.

The present invention relates to improvements in so-called rubber hose having embedded in its wall oppositely disposed spiral windings of reinforcing material, and it relates more particularly to improvements in the reinforcing spirals and to improvements in the hose brought about by them.

Objects of the present invention are to provide reinforcements which can be readily introduced into the wall of the hose which in proportion to their thickness possess great strength and resistance to elongation, which oppose undue folding, curling and transverse distortion, and which oppose the passage of rubber through them and at the same time present the requisite rough surface.

The reinforcements, according to this invention, are flat, imperforate metal ribbons so that they oppose the passage of rubber or rubber material through them, and the imperforate metal ribbon reinforcements may advantageously and as a further improvement include in effect and as an integral part thereof parallel wire forms arranged lengthwise of the ribbon and they make the reinforcements compact in thickness and they also oppose stretching or elongation and they provide the necessary degree of crosswise flexibility. Such ribbons may be easily introduced into the hose and if the wire forms or some of them become detached in use no serious harm results.

For a further exposition of my invention reference may be had to the annexed drawing and specification at the end of which my invention will be specifically pointed out and claimed.

In the drawing:

Figure 1 is a side elevation of my device with parts in longitudinal and in transverse cross section and with parts broken away.

Fig. 2 is a partial transverse cross section.

Fig. 3 is a plan view of my preferred ribbon form.
Fig. 4 is a cross section of my preferred ribbon form.

Fig. 5 is a cross section of a modified form of ribbon form.

Fig. 6 is a cross section of another modification of ribbon form.

In the embodiment of my novel hose chosen for illustration in the drawing, the hose is shown as consisting of an inner tube 1 of rubber. Surrounding inner tube 1 there is a layer 2 which may consist of a number of plies and canvas, duck and rubber. Surrounding this layer 2 there is another layer which consists of a plurality of imperforate metal ribbon forms 3 which are helically wound about the hose and which are each separated by a separating strip 4 of cord rubber or of rubber and duck, or of any like material. Surrounding this layer there is a layer 5 which may be of rubber and duck material. Surrounding this layer 5 there is another layer which consists of a plurality of imperforate metal ribbon forms 6 which are also wound in helixes. These helixes spiral in the opposite direction to that in which the ribbon forms 3 are wound. Imperforate metal ribbon forms 3 and 6 may otherwise be identical or they may be made one, of one of the modifications of ribbon form which I have illustrated, and the other, of another modification illustrated. Ribbon forms 6 are separated by a plurality of separating cords 7 of cord rubber or rubber and duck or like material. Surrounding ribbon forms 6 there may be another layer 8 which may be composed of canvas, duck and rubber or any other suitable material. At or near its outer surface, the hose is provided with a protecting layer of wire which is embedded in the hose or placed on the outer surface or of armor which surrounds the hose and forms its outer surface. This armor resists the radial pressure of the hose while the ribbon forms resist elongation. This armor, as shown in the drawing, is on the outside of the hose and is composed of two strips of metallic material 9 and 10 which are wound in helixes having a short spiral and which are provided with rounded surfaces at the points of contact between the helixes.

Referring now more particularly to Figures 3 and 4, wherein is disclosed my preferred type of ribbon form, this ribbon form consists of a plurality of parallel wires 11. Without intending to limit my invention thereto, an example of such wires are steel wires having a diameter of $\frac{1}{32}''$ more or less and a tensile strength of approximately 214 pounds more or less. These parallel wires are laid side by side substantially in contact with each other and are fastened together into a ribbon form. This ribbon form may consist of fourteen wires which form a ribbon $\frac{7}{16}''$ in width and $\frac{1}{32}''$ in thickness. This is merely an example and ribbon forms may be made of other sizes. These wires may be fastened together in substantial contact with each other by a metallic coating which can be applied by running the wires side by side together through a bath of molten metal, such as a solder of lead and tin. This coating is used for two purposes; it holds the wires in convenient ribbon form when applying them to the hose parts and it also operates to hold the wires in proper alignment in the hose. However, the metal coating is of such material that the ribbon forms are able to flex and bend slightly in a transverse direction as well as in the longitudinal direction.

In Fig. 5 there is shown a modified type of metal ribbon form which comprises a unitary structure having in effect wires 12 connected by webs 13. These webs 13 permit a slight bending or flexing of the ribbon form in its transverse dimension.

In Fig. 6 there is shown yet another type of metal ribbon in which the wire portions 14 are rectagular in cross section and in which 15 indicates the webs, uniting the wires into an imperforate unitary structure.

By reason of the fact that the described ribbon form is comparatively thin, the ribbon forms may be put on in multiple or one on top of the other with layers of rubber duck or canvas between without occupying undue room. On account of the strength of the ribbon forms and of the outside armor the number of plies of duck and rubber may be few in comparison with previously known hose capable of withstanding the same pressure.

I do not intend to be limited in the practice of my invention save as the scope of the prior art and of the attached claims may require.

I claim:

1. A hose composed of an inner layer of rubber, a surrounding layer of rubber and duck, a surrounding layer composed of all metal ribbon forms each form consisting of a plurality of metal wires fastened together in a flat imperforate ribbon form and wound in a helix having a comparatively long pitch and separating members between said forms, a surrounding layer of rubber and duck, a surrounding layer composed of all metal ribbon forms each form consisting of a plurality of metal wires fastened together in a flat imperforate ribbon form and wound in a helix having comparatively long pitch and separating members between the coils of said forms, a surrounding layer of rubber and duck, and an outer layer of armor composed of two metallic members wound in helixes having comparatively short pitch and having rounded surfaces at the points of contact between said helixes.

2. A hose comprising a body of rubberlike material having embedded therein a plurality of separated helically wound layers of flat imperforate all metal ribbon consisting of parallel wires bonded together arranged lengthwise of the ribbon, the convolutions of which are slightly spaced, one of the layers being wound in one direction and another of the layers being wound in the opposite direction, and a filler wound between the convolutions of the helixes.

3. A hose comprising a body of rubberlike material having embedded therein a plurality of separated helically wound layers of flat imperforate all metal ribbon consisting of parallel wires bonded together arranged lengthwise of the ribbon, one of the layers being wound in one direction and another of the layers being wound in the opposite direction.

HOWARD W. GOODALL.